United States Patent
Albonetti et al.

(10) Patent No.: US 10,022,774 B2
(45) Date of Patent: Jul. 17, 2018

(54) EMBOSSING METHOD AND APPARATUS

(71) Applicant: Sacmi Cooperativa Meccanici Imola Societa' Cooperativa, Imola (IT)

(72) Inventors: Danilo Albonetti, Sasso Morelli (IT); Stefano Bergami, Castel S. Pietro Terme (IT)

(73) Assignee: SACMI Cooperativa Meccanici Imola Societa' Cooperativa (IT)

( * ) Notice: Subject to any disclaimer, the term of this patent is extended or adjusted under 35 U.S.C. 154(b) by 248 days.

(21) Appl. No.: 14/978,398

(22) Filed: Dec. 22, 2015

(65) Prior Publication Data

US 2016/0175915 A1 Jun. 23, 2016

Related U.S. Application Data

(62) Division of application No. 13/322,700, filed as application No. PCT/EP2010/057256 on May 26, 2010, now Pat. No. 9,296,033.

(30) Foreign Application Priority Data

May 26, 2009 (IT) .............................. MO2009A0140
May 26, 2009 (IT) .............................. MO2009A0141
May 26, 2009 (IT) .............................. MO2009A0142
May 26, 2009 (IT) .............................. MO2009A0143

(51) Int. Cl.
*B21D 51/26* (2006.01)
*B21D 51/48* (2006.01)
(Continued)

(52) U.S. Cl.
CPC ............. *B21D 51/26* (2013.01); *B21D 51/48* (2013.01); *B29C 43/021* (2013.01); *B29C 43/08* (2013.01); *B44B 5/0019* (2013.01); *B29C 31/048* (2013.01); *B29C 2043/023* (2013.01); *B29C 2043/3634* (2013.01); *B29C 2043/5891* (2013.01)

(58) Field of Classification Search
CPC ........ B21D 51/48; B21D 51/46; B44B 5/009; B44B 5/0019; B44B 5/0033; B44B 5/022
See application file for complete search history.

(56) References Cited

U.S. PATENT DOCUMENTS 2,303,539 A 12/1942 Gibbs
2,593,439 A 4/1952 Gora
(Continued)

FOREIGN PATENT DOCUMENTS

CA 922064 3/1973
CN 2260695 Y 8/1997
(Continued)

*Primary Examiner* — R. K. Arundale
*Assistant Examiner* — Pradeep C Battula
(74) *Attorney, Agent, or Firm* — Laubscher, Spendlove & Laubscher, P.C.

(57) ABSTRACT

A method of embossing a crown cap comprises the steps of: detecting a pre-printed drawing on the bottom of the crown cap, varying the angular positioning of the crown cap so as to position the drawing according to a preset positioning, and impressing a raised/recessed pictogram on the bottom of the crown cap. The pre-printed drawing and the embossed pictogram will have a desired reciprocal position.

9 Claims, 18 Drawing Sheets

(51) Int. Cl.
    B29C 43/02     (2006.01)
    B29C 43/08     (2006.01)
    B44B 5/00     (2006.01)
    *B29C 31/04*     (2006.01)
    *B29C 43/36*     (2006.01)
    *B29C 43/58*     (2006.01)

(56) References Cited

U.S. PATENT DOCUMENTS

| | | | |
|---|---|---|---|
| 2,936,005 | A | 5/1960 | Wilckens et al. |
| 3,122,116 | A | 2/1964 | Hagmann et al. |
| 3,122,253 | A | 2/1964 | Hagmann et al. |
| 3,278,985 | A | 10/1966 | Everett |
| 3,577,595 | A | 5/1971 | Smith et al. |
| 3,705,122 | A | 12/1972 | Gwinner |
| 3,908,572 | A * | 9/1975 | Johnson .................. B21D 51/46 413/27 |
| 4,136,629 | A * | 1/1979 | Luthi .................... B21D 51/383 413/14 |
| 4,588,465 | A | 5/1986 | Paciorek |
| 4,863,333 | A * | 9/1989 | Kaminski .............. B21D 51/26 413/69 |
| 5,457,943 | A | 10/1995 | Hertrampf |
| 5,686,040 | A | 11/1997 | Taber |
| 6,338,263 | B1 | 1/2002 | Obata et al. |

FOREIGN PATENT DOCUMENTS

| | | |
|---|---|---|
| CN | 2429314 | 5/2001 |
| DE | 1173866 B | 7/1964 |
| DE | 4122783 | 1/1992 |
| DE | 19842750 A1 | 4/2000 |
| EP | 0462513 A1 | 12/1991 |
| EP | 1036607 A2 | 9/2000 |
| EP | 1669142 A1 | 6/2006 |
| EP | 1769916 A2 | 4/2007 |
| FR | 2271888 A1 | 12/1975 |
| FR | 2783509 A1 | 3/2000 |
| GB | 257908 | 4/1927 |
| GB | 386461 | 1/1933 |
| GB | 404889 | 1/1934 |
| GB | 409389 | 5/1934 |
| GB | 1054451 | 1/1967 |
| GB | 1109812 | 4/1968 |
| JP | 54062079 A | 5/1979 |
| JP | 62135165 A | 6/1987 |
| JP | 09024425 | 1/1997 |
| JP | 2001288581 A | 10/2001 |
| JP | 2003164931 A | 6/2003 |
| KR | 20050009324 A | 1/2005 |
| SU | 1821268 A1 | 6/1993 |

* cited by examiner

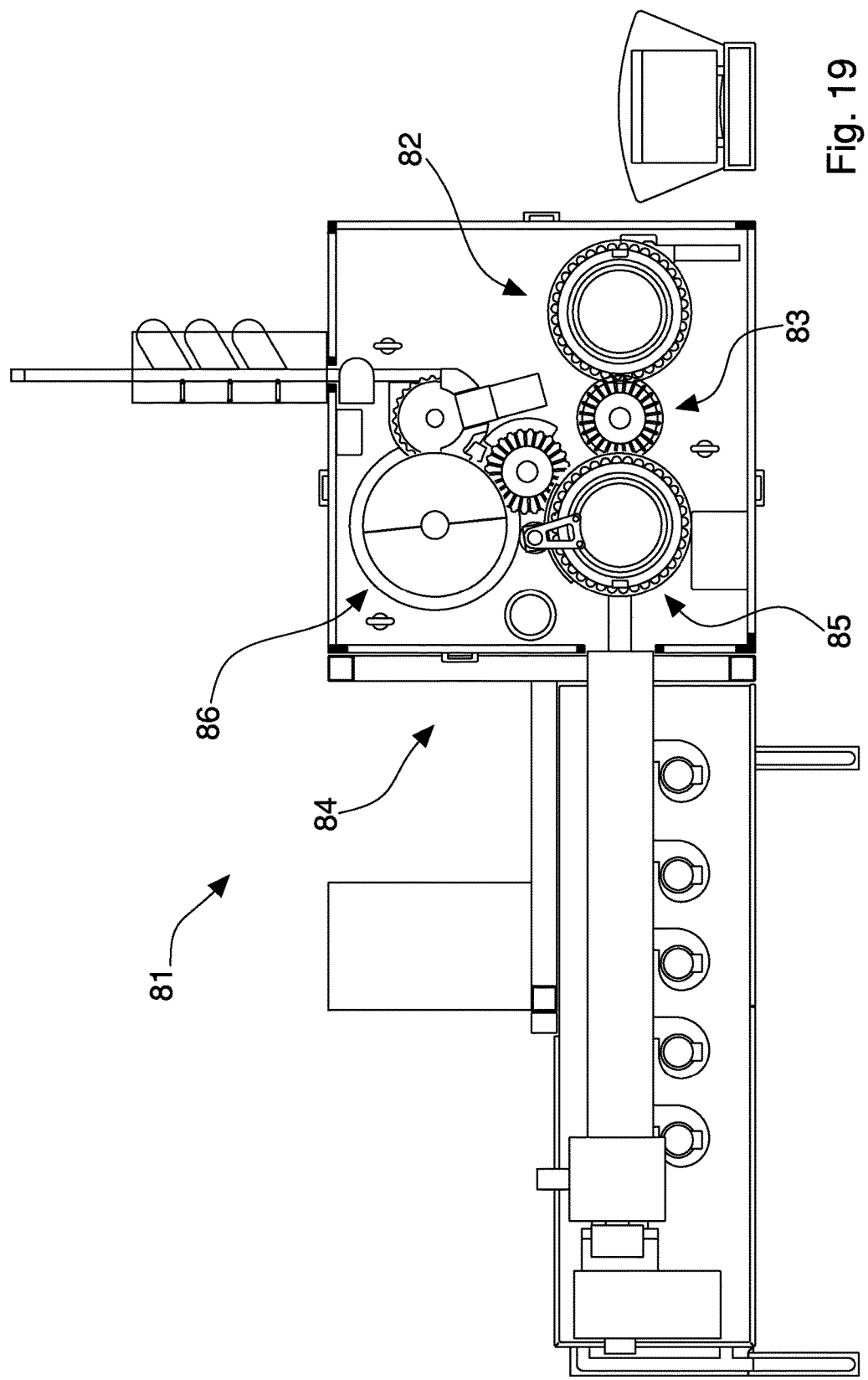

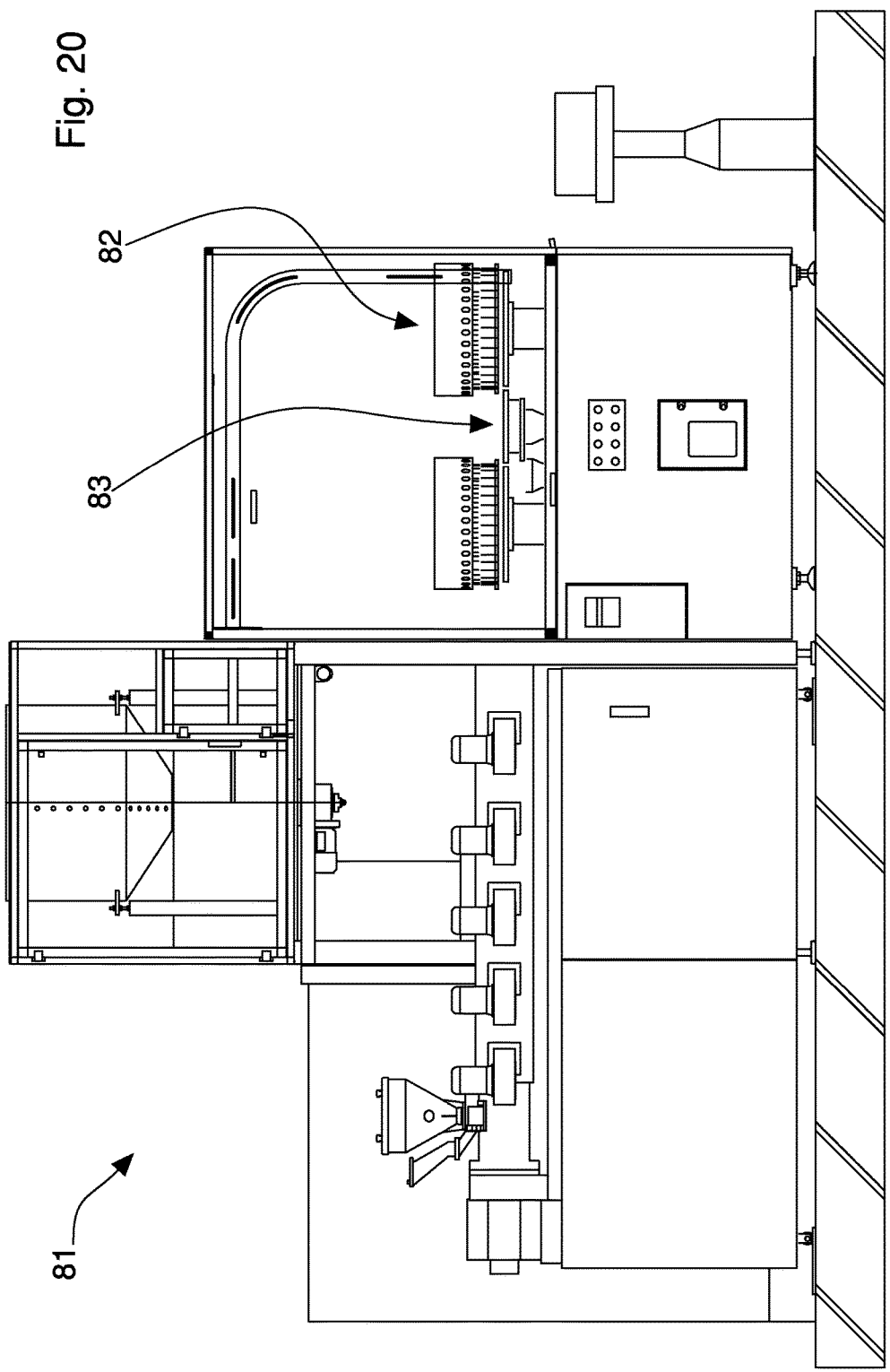

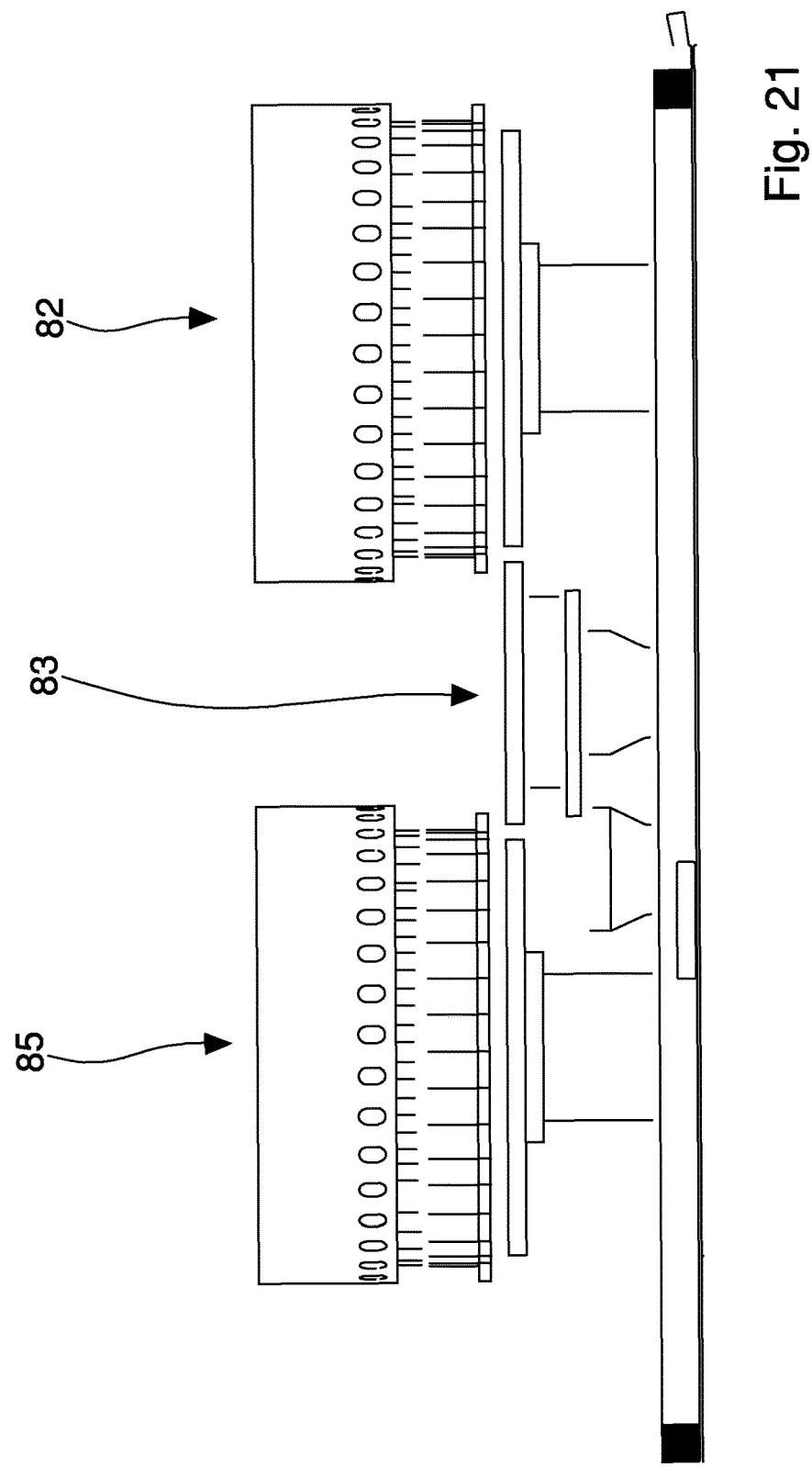

EMBOSSING METHOD AND APPARATUS

This application is a division of U.S. application Ser. No. 13/322,700 filed Nov. 28, 2011 (with an effective filing date of Feb. 1, 2012) which was a § 371 National Stage entry of PCT International Application No. PCT/EP2010/057256 filed May 26, 2010. PCT/IB2010/057256 claims priority of IT Application No. MO2009A000140 filed May 26, 2009, IT Application No. MO2009A000141 filed May 26, 2009, IT Application No. MO2009A000142 filed May 26, 2009, and IT Application No. MO2009A000143 filed May 26, 2009. The entire content of these applications are incorporated herein by reference.

The invention relates to an embossing method and apparatus, in particular for the production of caps for containers having at least one part provided with impressed raised and/or recessed elements.

Specifically, but not exclusively, the invention can be used to produce caps made of metal material such as, for example, crown caps for bottles, lids for jars, etc.

Forming a pictogram (for example a drawing, a decoration, a message, a symbol, a brand, etc) on a cap for containers by means of raised printing, or embossing, obtained by a compression-embossing punch is known.

Patent publication KR 20050009324 discloses the continuous production of caps in which a cylindrical cap is machined by a first forming arrangement to reduce the width thereof, by a second forming arrangement to shape the cylindrical cap into a frusto-conical shape, by a third and a fourth forming arrangement to generate various notches on the frusto-conical surface, and by a fifth forming arrangement including a compression punch cooperating with a counterpunch or die to obtain a raised pattern on the end wall of the cap. From U.S. Pat. No. 3,705,122, moulding raised patterns on the seal of a crown cap is also known. GB patent Nos. GB 409389 and GB 404889 disclose the blanking and shaping of a strip of metal to obtain caps that are subsequently embossed with a punch in an embossing station to obtain a raised pictogram. U.S. Pat. No. 4,588,465 discloses a carousel rotating between various positions, in which the cap is supplied to the carousel in a first position, an adhesive is deposited into the cap in a second position, a previously blanked seal is glued on the cap in a third position and an embossing punch impresses a raised design on the seal in a fourth position.

Patent publication GB 1109812 shows an apparatus for producing decorated metal caps for bottles, in which on a rotating machine a step of embossing caps occurs. Patent publication FR 2783509 discloses the insertion of a seal into a crown cap and the subsequent punching of the lateral surface to fix the seal to the cap. From patent publication GB 257908 obtaining metal caps provided with decorations is further known, with decorations that are both coloured and raised by means of an embossing punch with notched parts that are coloured before embossing. Forming raised designs on the bottom of a crown cap directly in the moulding and drawing press of the hollow-body structure of the cap for containers (for example of the casing or shell of the crown cap) is also known.

In each of patent publications CA 922064 and DE 9173866 a compression punch that forms a gasket of a closure bar containers is disclosed. Each of patent publications U.S. Pat. No. 6,338,263, EP 1759918 and EP 1669142 discloses a method as in the preamble of claim 1.

SUMMARY OF THE INVENTION

An object of the invention is to improve the embossing of concave bodies with a compression punch.

In particular, the present invention relates to the formation of (raised and/or recessed) imprints in relief (embossing) performed separately with respect to the moulding (pressing) and drawing of the concave body (e.g. the structure of the hollow body of a cap of a container). In other words, the concave body may be embossed after the structure of the concave body has been made in the press, typically by forming and drawing of sheet metal. In particular, embossing may take place outside the forming press of the concave body.

An advantage of the invention is to provide a method for forming a concave or hollow body that has at least a pattern and an embossed part in relief in which the pattern and the embossed part are arranged according to a preset reciprocal arrangement. An advantage is to provide a constructionally simple and cheap apparatus for implementing the aforesaid method. An advantage is to provide a cheap and simple method for forming a concave body that is provided internally with a seal.

An advantage is to provide a constructionally simple and cheap apparatus for forming a hollow body provided internally with a seal. An advantage is to provide an embossing apparatus, that is in particular suitable for embossing concave-body elements such as, for example, caps for closing containers, able to emboss objects without deforming or damaging the objects. An advantage is a simplification of production of embossed caps provided internally with a plastic seal gasket.

An advantage is to provide an embossing apparatus, that is in particular suitable for embossing concave-body elements such as, for example, caps for closing containers, provided with relatively high productivity.

An advantage is to permit relatively great flexibility in the production of a concave body having at least one side on which at least two different designs-pictograms are present, in particular obtaining the designs-pictograms at times and/or in places that are different from one another. An advantage is to obtain a concave body provided with graphic representations that is able to provide a particularly pleasant aesthetic effect.

An advantage is to enable a concave, embossed body with an internal seal to be formed in a rapid manner. An advantage is to obtain raised and recessed pictograms on two opposite sides of an object. An advantage is to provide an apparatus that is able to emboss effectively objects with a relatively complex shape, such as crown caps or other types of caps for containers. An advantage is to make an apparatus that is able to perform embossing on relatively small objects with relatively high precision. An advantage is to make an apparatus with relatively small overall dimensions available. An advantage is to make an apparatus that is able to perform embossing on relatively small objects with relatively high precision. An advantage consists of a reduced risk of damage to the embossed object.

Such objects and advantages and still others are all reached by the method and/or the apparatus according to one or more of the claims set out below.

BRIEF DESCRIPTION OF THE DRAWINGS

The invention can be better understood and implemented with reference to the attached drawings that illustrate some non-limiting embodiments.

FIG. 19 is a top plan view of an apparatus for producing caps (crown caps) provided with embossing and with an internal seal for closing containers.

FIG. 20 is a lateral bottom view, in a vertical elevation, of FIG. 19.

FIG. 21 is an enlarged detail of FIG. 20.

DETAILED DESCRIPTION

A description follows below of some apparatuses for embossing caps for containers starting from caps already produced in previous machinings. The embossing is in particular used to impress on the cap a raised design or pictogram, such as, for example, a message, a symbol, a code, a logo, a brand, a graphic representation or any other raised element having a preset conformation and/or arrangement. Such previous machinings are already known and will not therefore be discussed in detail in the present description. Such known machinings may in particular comprise at least a (compression) forming operation such as for example forming by blanking and drawing sheet metal in order to obtain from a sheet (continuous or discrete) of sheet metal a plurality of concave bodies that will form the main structure (casing or shell) with which to make the caps for containers.

The caps for containers that are the object of the present description may in particular relate to caps having at least a main concave body structure (casing or shell) made of metal. It is possible that the caps in question are optionally crown caps for bottles or metal lids for various types of receptacle.

In this description methods and apparatuses will then be discussed in which the embossing for impressing raised portions on the cap will be achieved separately, at another time and/or in another place, with respect to the operation of forming the concave structure of the cap, for example through pressing, i.e. in which embossing the already moulded cap structure is provided. It is, for example, possible to perform the embossing machining in the same step (substantially at the same time and/or in the same place) as the so-called lining operation, i.e. moulding the seal gasket inside the main concave body structure (casing or shell) of the cap.

Figure 1:
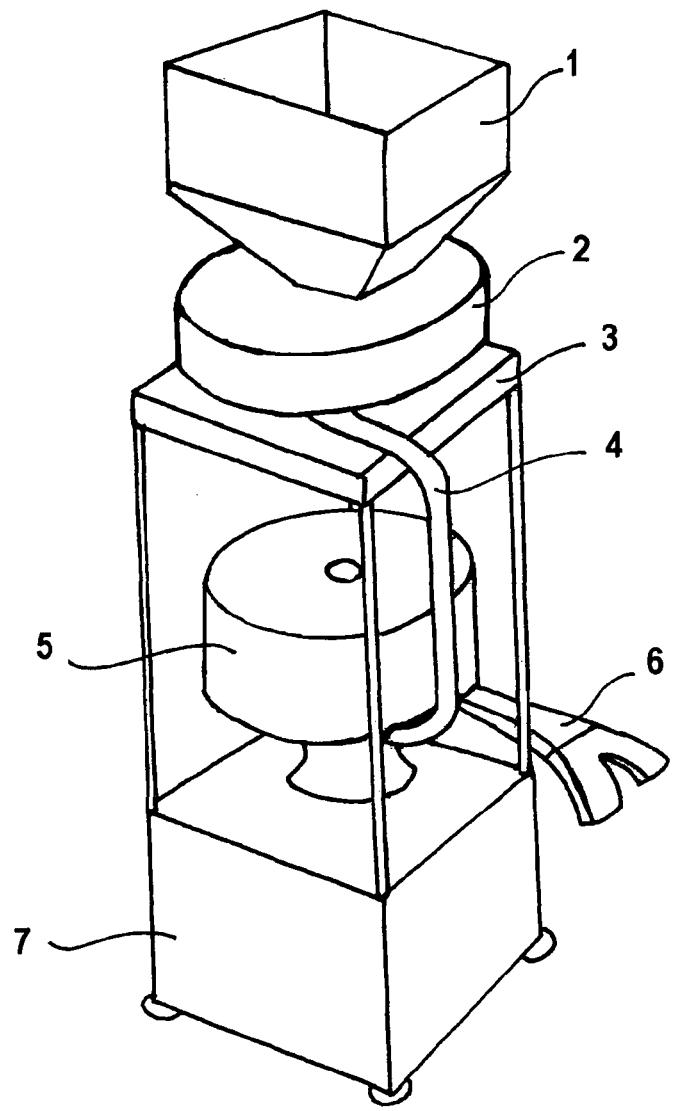
FIG. 1 is a perspective schematic view of an apparatus for embossing closing caps for containers of the conveying carousel type.

With reference to FIG. 1, an apparatus is represented for embossing caps for containers (for example crown caps) starting from the caps already formed in a known manner (for example formed by operations of blanking and drawing sheet-metal or laminate material). This apparatus, in particular, is suitable for machining in a substantially independent manner with respect to the forming apparatus that prepares the caps to be embossed. In substance, the apparatus in FIG. 1 is not necessarily arranged for operating in line or continuously with respect to one or more cap-forming apparatuses.

The embossing apparatus may comprise, as in the case in FIG. 1, a hopper 1 that is configured for receiving the concave body structure of the caps (casings or shells, which are typically metal). The hopper 1 is in particular provided for receiving the caps arranged loosely.

The hopper 1 is connected to a supplier 2, for example of rotating type, configured for receiving the caps from the hopper 1 and for supplying the caps in an orderly manner, for example in a single row, to a user downstream. In this specific case, the supplier has an outlet connected to a supply channel 4 that could be provided with a positioning device for positioning the caps (of known type) that is able to arrange the caps according to a desired positioning or arrangement, for example with the concavity facing upwards or downwards.

With 3 there is shown a frame or upper support configured for supporting the cap supply system and comprising in the case in point the hopper 1 and the supplier 2, with 5 a conveying carousel where the caps are embossed, with 6 an unloading channel for removing and conveying the embossed caps leaving the carousel, with 7 a main base configured for supporting the carousel.

The conveying carousel or embossing carousel 5 is rotatable (in a continuous manner) around a rotation axis that in the case in point is vertical. The conveying carousel 5 comprises a plurality of operating units, each of which comprises an embossing device (as will be better explained below). The operating units are arranged on the periphery of the carousel spaced angularly apart from one another. The conveying/embossing carousel is provided (inside) with various devices (that are of known type and are not disclosed in detail) that are arranged for moving and driving the various movable and operating parts of the operating units.

The main base 7 could contain internally the various devices set up for rotating the carousel (for example the motor). The discharge or outlet channel 6 could comprise a conduit, for example substantially fixed, having a portion arranged in an outlet zone of the carousel to divert the cap from the orbital rotational motion (the caps having such an orbital rotational motion by virtue of the fact of being carried by the rotating carousel) to an outlet motion that is radial or presents at least one radial component to the outside so as to exit and move away from the carousel.

Figure 2:
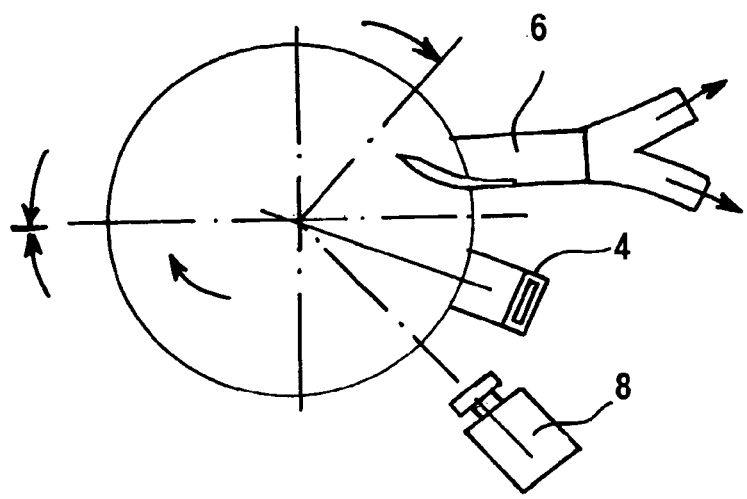
FIG. 2 shows a top plan view of the apparatus in FIG. 1.

With reference to FIG. 2, with 8 there is indicated a sensor that is set up for detecting the preprinted drawings (for example lithographical designs) on the surface of the caps. The sensor 8 could also comprise a camera vision system or another sensor of optical type.

In this specific apparatus it is provided for that each cap (or concave structure or casing or shell structure) is processed by the apparatus with a bottom portion (bottom) facing upwards (i.e. the concavity of each hollow body structure faces downwards).

Figure 3:
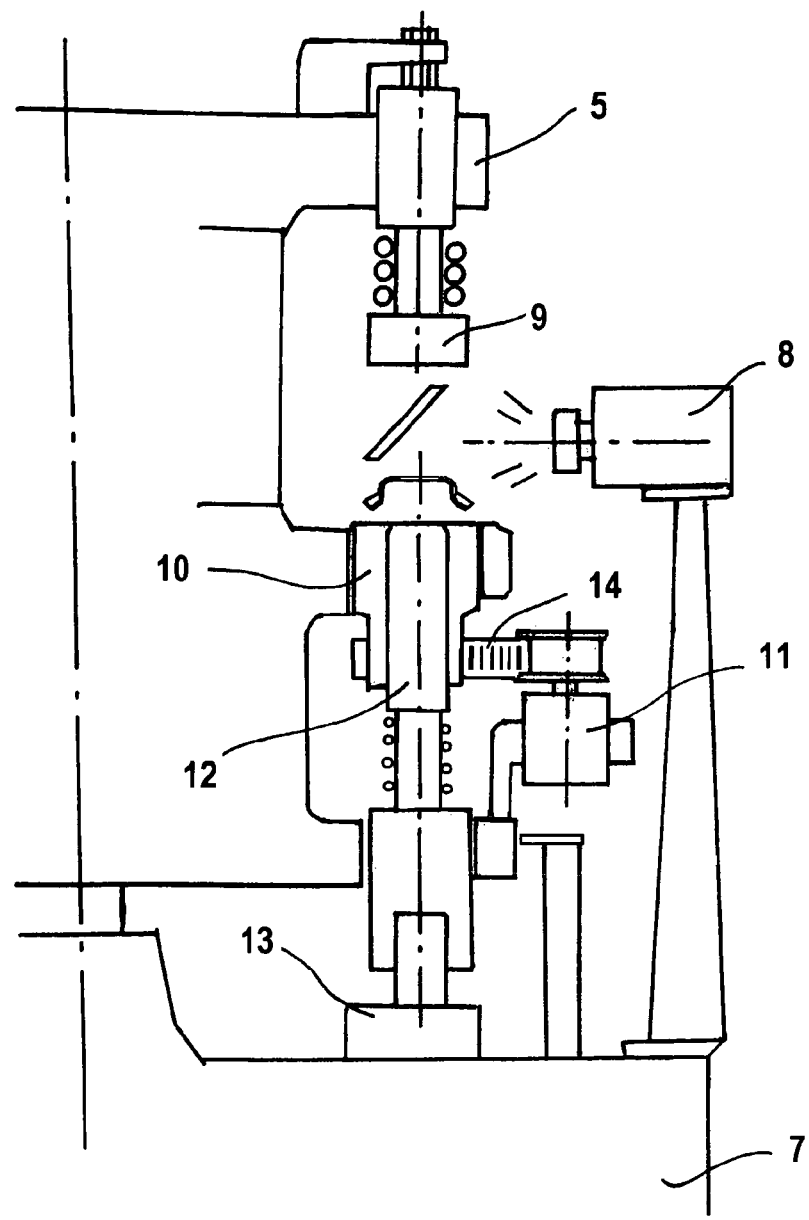
FIG. 3 is a vertical elevation view of a part of the apparatus in FIG. 1 comprising the zone for detecting the preprinted image on the caps.

With reference to FIG. 3, with 9 there is indicated the upper portion of the embossing tool, with 10 a supporting element of annular shape configured for restingly receiving an annular peripheral zone of the cap, with 11 a motor arranged for rotating the supporting element 10 that can rotate on itself or around a (vertical) rotation axis that in the specific case coincides with the embossing axis, with 12 an embossing punch (lower or counterpunch) configured for impressing a pictogram (any type of figure or symbol or design or raised element with desired shape and arrangement) on the bottom of the cap, with 13 a cam member for driving the movement of the embossing punch 12, with 14 a transmission system for transmitting the motion from the motor 11 to the supporting element 10.

Figure 5:
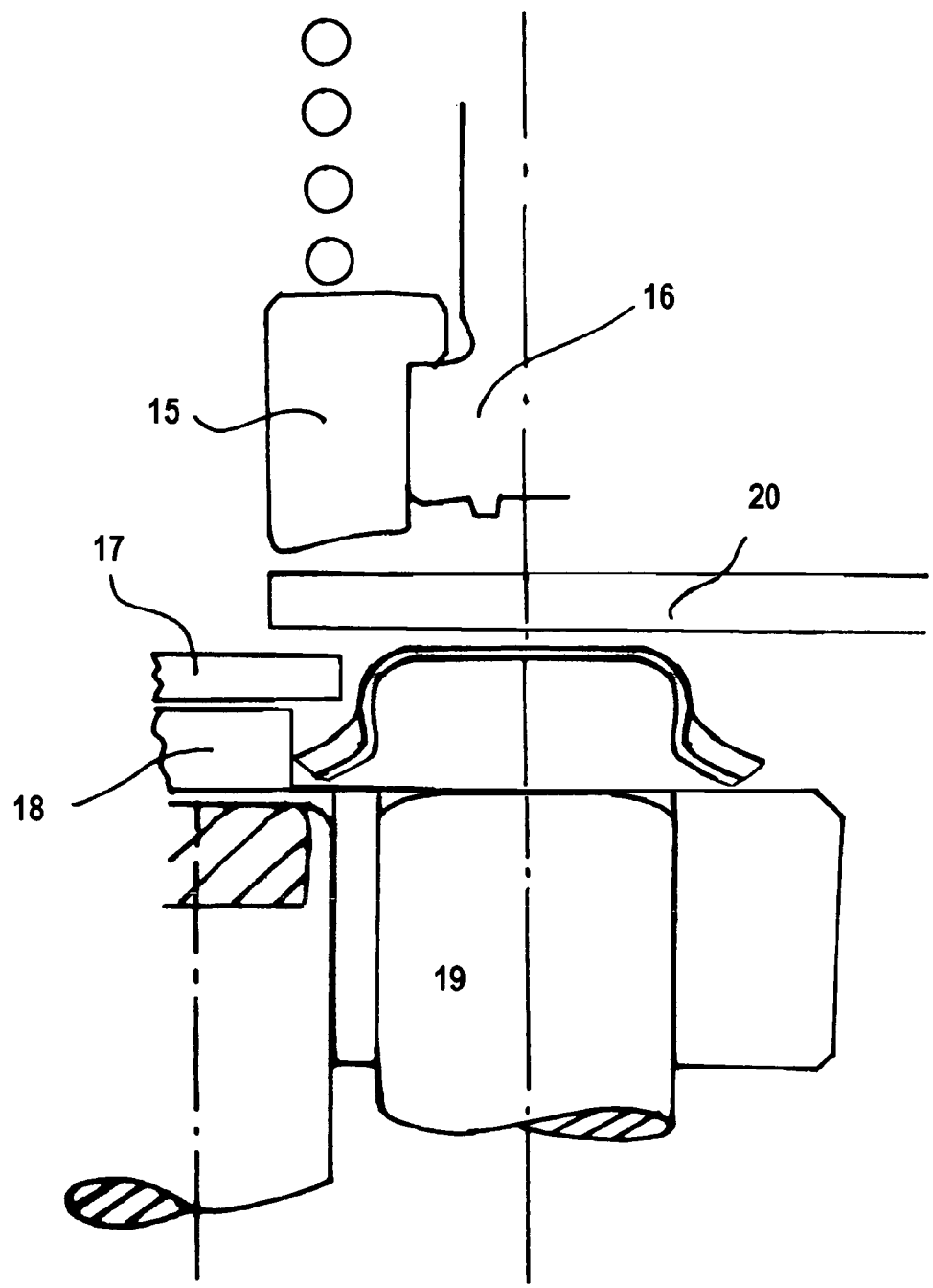
FIG. 5 shows a detail of the apparatus of the preceding figures showing some parts of one of the embossing devices that are rotated by the conveying carousel.

In FIG. 5 the embossing device is disclosed in greater detail. With 15 a sheet-metal presser has been indicated for retaining the caps in position, with 16 an embossing punch (upper), with 17 an extracting member for expelling the cap from the carousel, with 18 a gripping device (for example of the star type) to take and drag the cap rotating together with the carousel, with 19 the lower portion of the embossing tool overall (comprising the lower punch 12 and the supporting element 10 that could in turn be loaded from an elastic element, similarly to the sheet-metal presser 15, or could be stiffly coupled), with 20 a lid or upper containing element for the caps that move along a circular path moved by the gripping device 18.

The upper portion 9 of the embossing tool comprises the sheet-metal presser 15, which is configured for operating on an annular peripheral zone of the cap, and further comprises the embossing punch 16 that has the raised parts (and/or recessed parts) for impressing the pictogram on the cap (in cooperation with corresponding recessed or raised parts on the other punch, i.e. the lower punch or counterpunch). The sheet-metal presser 15 is provided with an elastic element (for example a calibrated spring) that loads the sheet-metal presser 15 with a set force so as to enable controlled deformation of the sheet metal that forms the bottom portion of the cap that is embossed.

Operation will be disclosed below.

The caps are supplied and conveyed in the supply channel 4 and then enter in an orderly manner (for example one by one) the conveying carousel 5 where embossing occurs.

Figure 4:
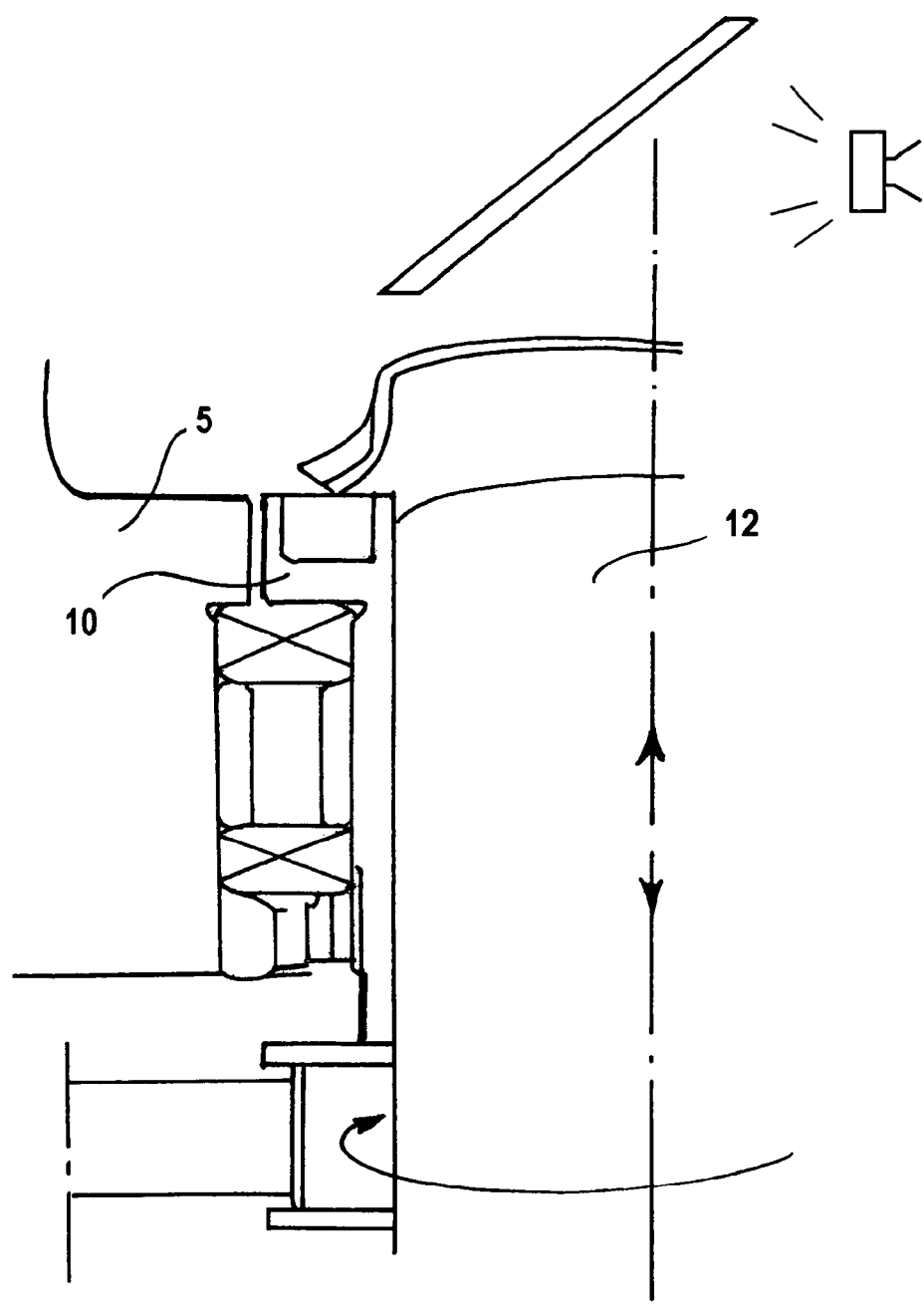
FIG. 4 is an enlarged detail of FIG. 3.

The caps are guided to be positioned in the gripping device 18 (conveying star), which conveys the caps along the rotational path of the carousel. The caps are substantially contained above by the lid 20. Each cap is retained by the supporting element 10 through a retaining device, for example of the magnet or suction type. The supporting element 10 is connected to the motor 11 (for example a stepping motor) that is able to rotate the supporting element 10 by a set amount through an electronic drive and control (feedback control guided by the sensor 8 which detects the position of the image present on the cap). The cap, which has been taken from the carousel and rotated by the latter, passes in front of the sensor 8 (for example via a 90° image shot that is shown in FIGS. 3 and 4), which detects the lithographical design printed on the surface of the cap.

The control unit (not shown) commands the motor 11 on the basis of the image signal supplied by the sensor 8. The supporting element 10 of the cap is then commanded to rotate by the amount necessary for placing in phase (i.e. with a desired corresponding arrangement) the cap with the corresponding punch 16, i.e. to place in phase the preprinted design on the cap with the raised (or recessed) pictogram present on the punch that has to be impressed (embossed) on the cap.

Continuing on the path, the cap that has already been placed in phase (i.e. positioned in the desired position) is raised by the lower punch 12, which is in turn moved (raised) by the cam 13. The cap then comes into contact with the sheet-metal presser 15 and is (immediately) locked thereby before the lower punch 12 and the upper punch 16 start to compress the cap to perform embossing. After which, the further movement of the lower punch 12 causes deformation of the cap and embossing of the pictogram.

Subsequently, the cap, still continuing in the rotational path guided by the carousel, remains retained by the lower punch 12, which starts to descend by moving away from the upper punch 16. The cap thus comes into contact with the supporting element 10 and at that point the (fixed) extracting member 17 intervenes to convey the caps to the discharge or outlet channel 6.

Figure 7:
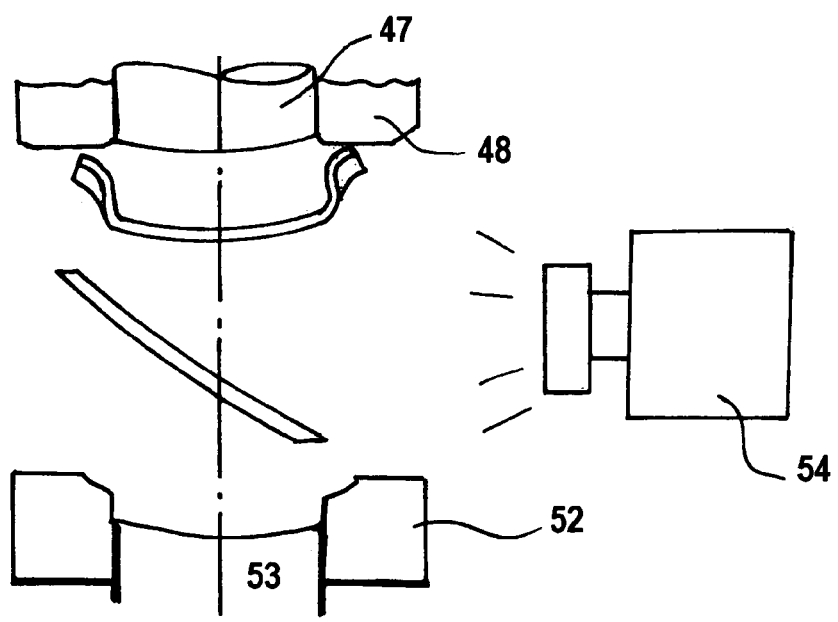
FIG. 7 shows a detail of the apparatus embodiment of FIG. 6 in a detecting zone for detecting the preprinted design on the caps.
Figure 6:
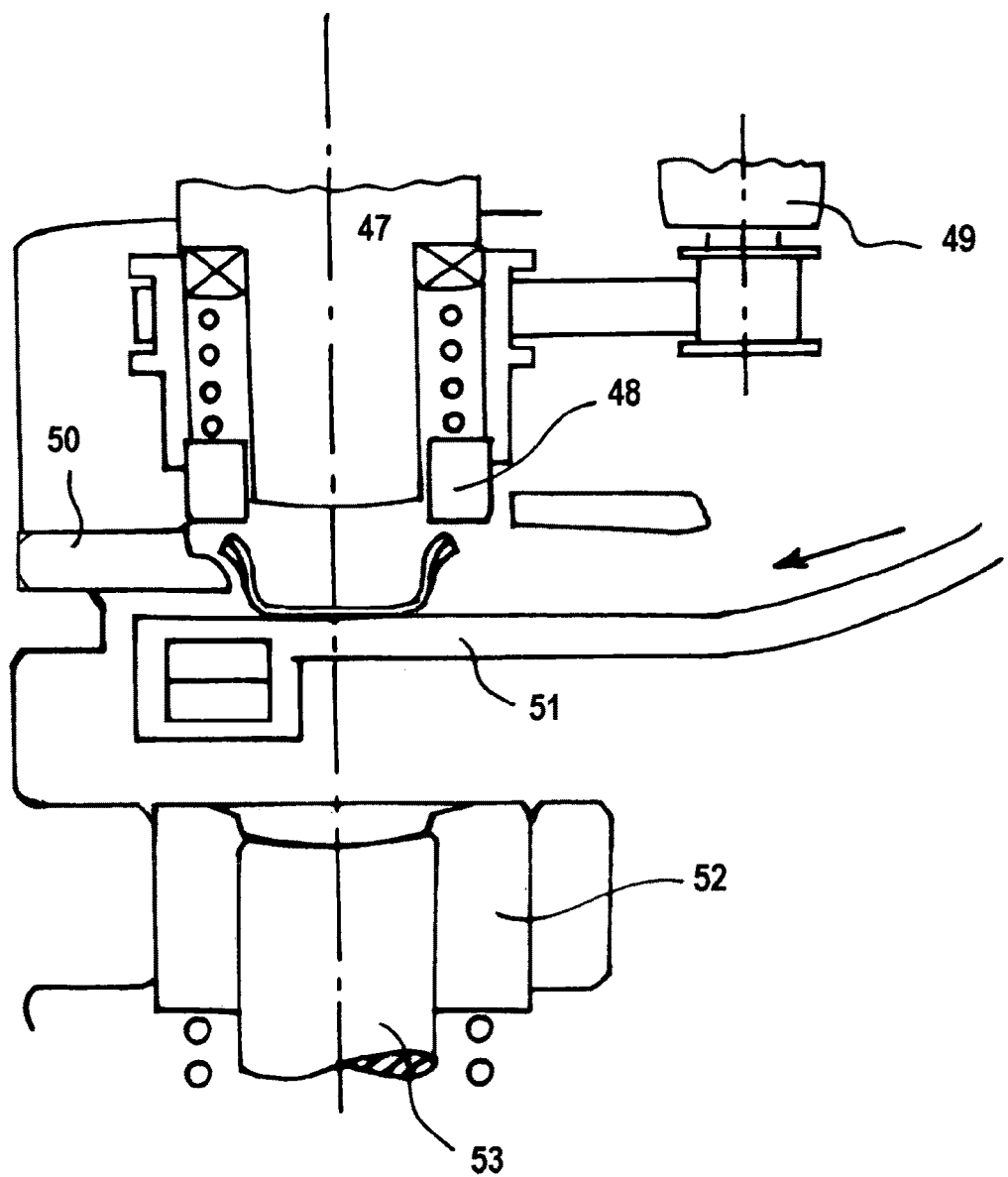
FIG. 6 shows a detail of an operating unit rotated by a conveying carousel according to another embodiment that is suitable for the machining (embossing) of caps with the bottoms facing downwards.
Figure 8:
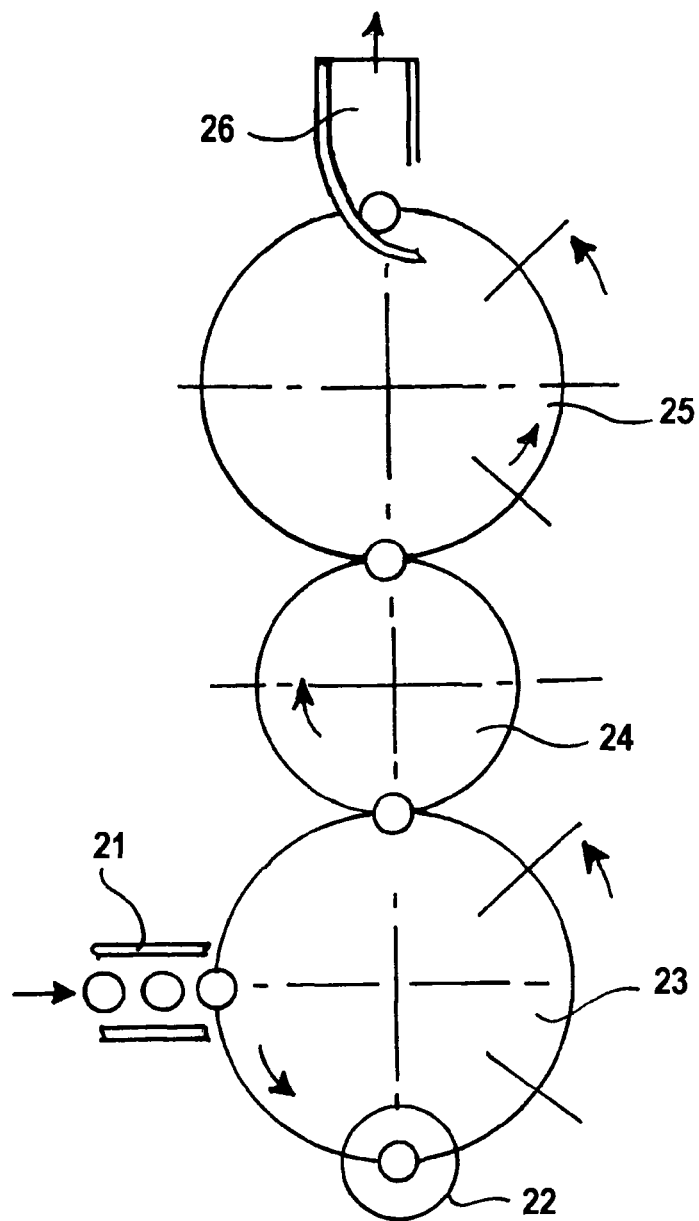
FIG. 8 shows a top view of an embossing apparatus for caps of the type with several serially connected operating carousels.

Now referring to FIGS. 6 and 7, an embossing apparatus is disclosed in which the caps are processed with the concavity facing upwards, i.e. with the bottom facing downwards. In this case the caps arrive, as previously, from the supplying channel and pass through a conveying plane 51, for example a sliding plane with magnets. The caps are then positioned so as to be grasped by the gripping device 50 (for example of the conveying star type) to be able to be dragged by the carousel (similarly to what has been disclosed previously) that carries to the periphery a plurality of embossing devices angularly spaced apart.

Each embossing device includes an upper punch 47 that can optionally dispose of a cap retaining arrangement such as, for example, a pneumatic device having a suction channel operating as a suction cup, or a magnet device. A sensor 54 is provided for detecting the image printed on the cap, including for example a camera, with a possible 90° image shot to be able to position the image sensor laterally with respect to the passage zone of the caps (as in the example disclosed previously). The sensor is in particular able to detect the position of the design (for example lithographic print) on the cap.

A motor 49 is configured for moving (rotating) an annular gripping element 48 such as to position the cap in phase with the punch 47. The latter is located inside the annular gripping element 48, similarly to the lower punch 12 and to the supporting element 10 of the previous example.

The embossing process in this case comprises the upward movement of a lower embossing punch 53 that approaches the upper punch 47. This (lifting) movement leads, initially, to contact with the cap and an annular sheet-metal presser 52 element (that surrounds the lower punch 53) and thus to compression interaction on the cap of the punches 47 and 53 to perform embossing.

Now referring to FIGS. 8 to 11, a cap embossing apparatus is now disclosed in which the operation of varying the positioning of the caps (for placing the preprinted design in phase with the pictogram that will be impressed by the embossing device), also comprising detecting the position of the design on the cap, is conducted on a carousel that is distinct from the carousel in which embossing of the pictogram takes place.

Figure 9:
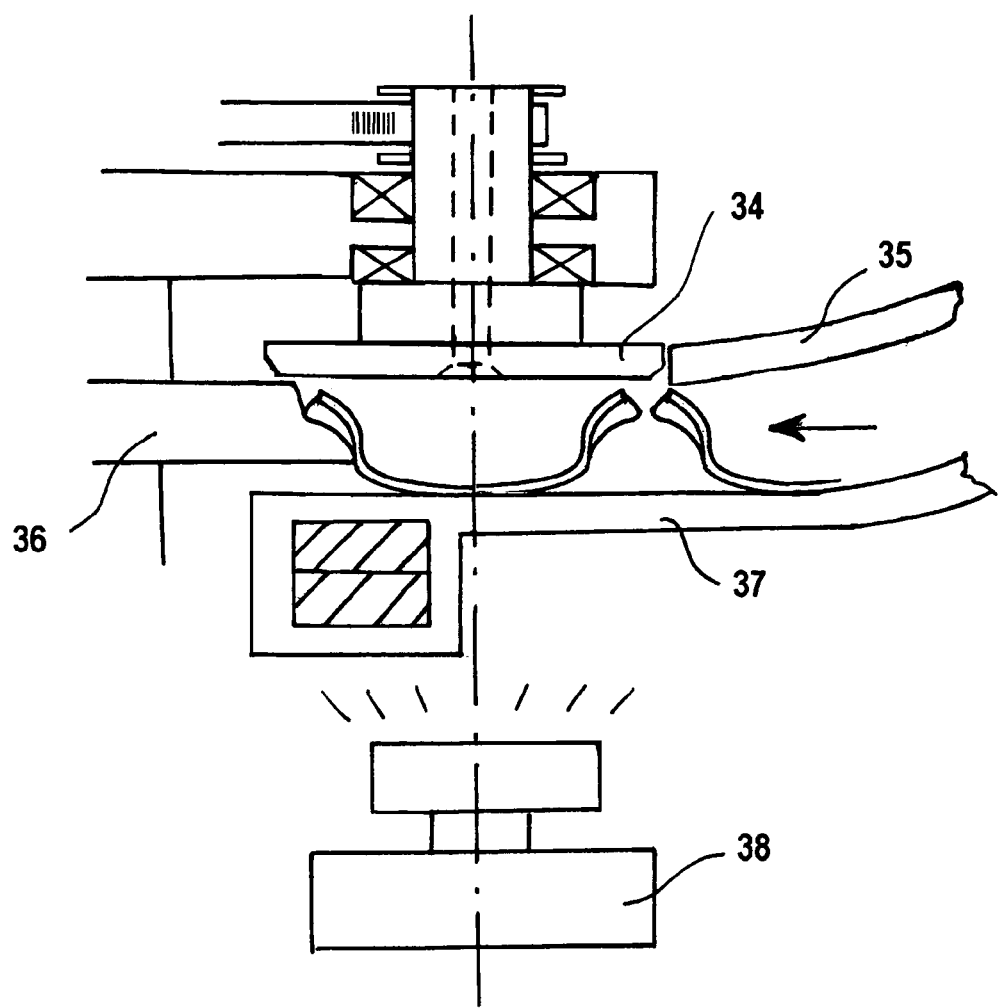
FIG. 9 shows a detail, in vertical elevation, of the first carousel of the apparatus in FIG. 8 in which the steps of detecting the preprinted image on the caps and phasing steps occur by means of the variation of the positioning of the caps, in an embossing apparatus embodiment in which the caps have the bottoms pointing downwards.
Figure 10:
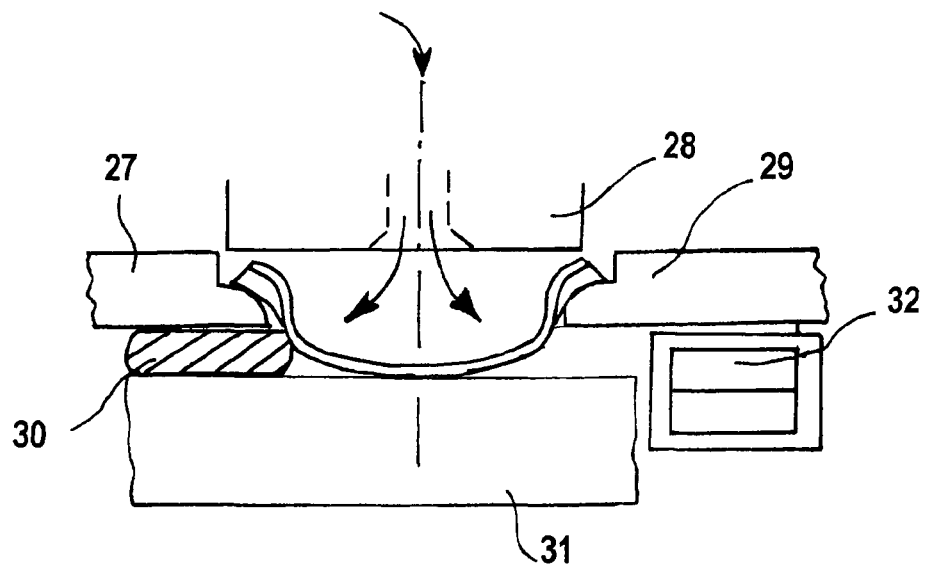
FIG. 10 shows a passage zone of the caps from the first carousel (in which phasing of the image on the caps in relation to the raised imprint occurs that will have to be subsequently embossed) to the second transferring carousel.

In this case the caps advance in sequence along a supply channel 21 and are then grasped and rotated by a first carousel or cap 23 positioning carousel in one of the manners disclosed already previously (see FIG. 9). In the first carousel 23 the step of detecting the design (lithography) by a sensor 22 and the phase of variation of the positioning (phasing) of the cap occur. The cap is then surrendered to a transferring carousel 24 illustrated in greater detail in FIG. 10, which shows a section of the transferring zone of the caps from the first carousel 23 (cap positioning or phasing carousel) to the transfer carousel 24.

The cap, which is carried by a grasping member 28 (for example a suction or magnetic grasping member 28) of one of the operating units of the first carousel 23, is transferred from this grasping member 28 to the carousel 24 using a detaching arrangement including, for example, a blowing device. The carousel 24 is provided with a cap gripping system that may include a star element 29 that, for example, could receive the caps from another star conveying element 27 of the first carousel 23. A (fixed) extracting member 30 can also be provided for facilitating the expulsion of the cap from the first carousel 23. A sliding plane 31 has been identified on which the caps slide and a retaining element 32 has been identified (for example of the magnet type) operating to ensure retaining of the caps by the transferring carousel 24, keeping the caps in position towards the centre of the star conveying element 29. It is further possible to arrange an external guiding element to contain the caps laterally that are retained on the star element 29.

Figure 11:
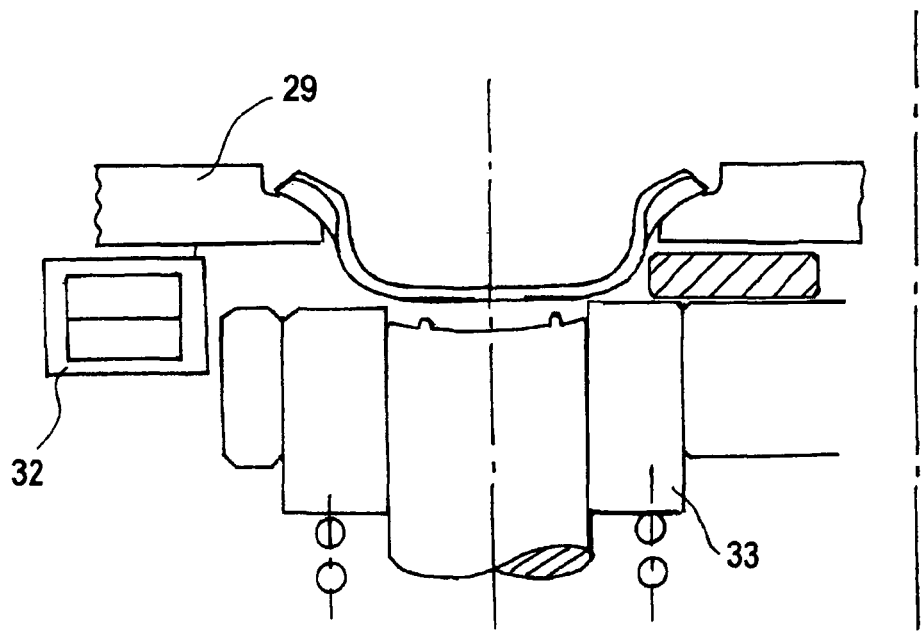
FIG. 11 shows a detail of the third carousel of the apparatus in FIG. 8 in which the step of embossing the raised imprint on the caps occurs.

In FIG. 11 the cap transferring zone between the transferring carousel 24 and the embossing carousel 25 is represented.

In this zone the cap passes from the gripper operated by the star gripping elements 27 and 29 to a supporting element 33 (carried by the operating unit of the carousel 25) that moves upwards to interact in contact with the cap. The supporting element 33 is annular in shape and can optionally perform the function of sheet-metal presser during the embossing step (as already seen in previous examples). It is further possible to provide the supporting element 33 with a magnetic device for gripping and keeping the cap in position.

The forming by embossing operations substantially occur as already disclosed previously. Here the sheet-metal pressing device in FIG. 11 is positioned in the lower embossing unit.

Figure 12:
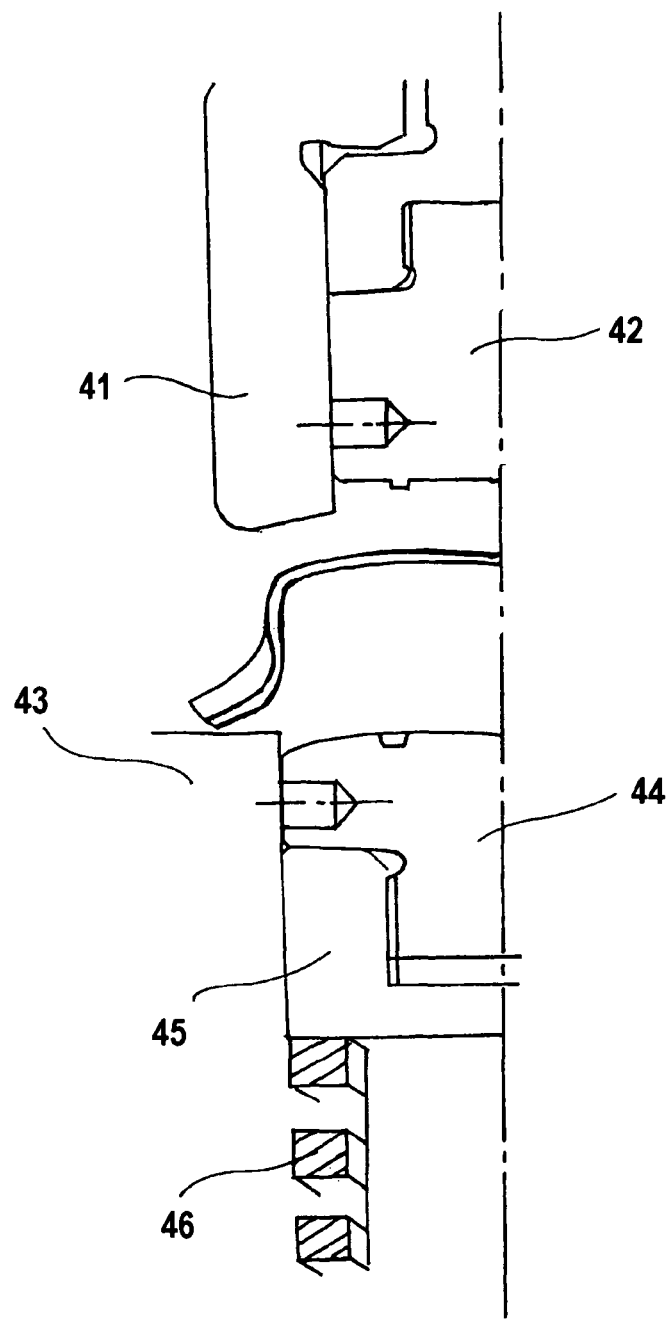
FIG. 12 shows a detail of an embossing device for caps configured for operating on caps with the bottom facing upwards.

With reference to FIG. 12, an embossing device is disclosed (optionally being part of one of the operating units arranged on the periphery of a conveying carousel) in which the lower embossing punch is made of at least two parts. An end part 44 is intended for contact with the cap and is constructed so as to be interchangeable, for example in function of the machining that it is intended to achieve on the cap.

The upper punch could also be made of at least two parts comprising at least an end part 42, intended for contact with the cap, which is made (in particular connected to the rest of the embossing punch by a releasable connection) so as to be interchangeable. At least one of the punches, for example the upper punch, could be provided with an annular member 41 with a sheet-metal presser function operationally connected to an elastic element (not illustrated). The lower punch could further comprise an annular portion 43 that surrounds the end part 44 and is configured for supporting the cap by means of contact with a peripheral portion of the cap. The lower punch may comprise an elastic element 46 operating in an embossing step on a second part 45 connected in a removable manner (for example by means of a screw connection) to the end part 44.

In this case the cap could be supplied as indicated previously with reference to FIG. 5, by means of a supply channel that conveys the caps to the carousel, in which each cap is contained above by the lid 20, is grasped by a star grasping element 18 and is retained, for example by magnets located below. In subsequent positions of the path of the carousel, the cap is taken to the upper part 9 of the embossing unit (sheet-metal presser 15 and embossing punch 16) through lifting of the lower part 19 of the unit.

At the end of forming (embossing), the lower unit 19 descends together with the embossed cap and at this point the extracting member 17 conveys the cap to the discharge/outlet channel 6.

In other embodiments it is possible to emboss the cap without needing to put the preprinted (lithographic) design on the cap into phase with the pictogram to be impressed on the cap.

Figure 13:
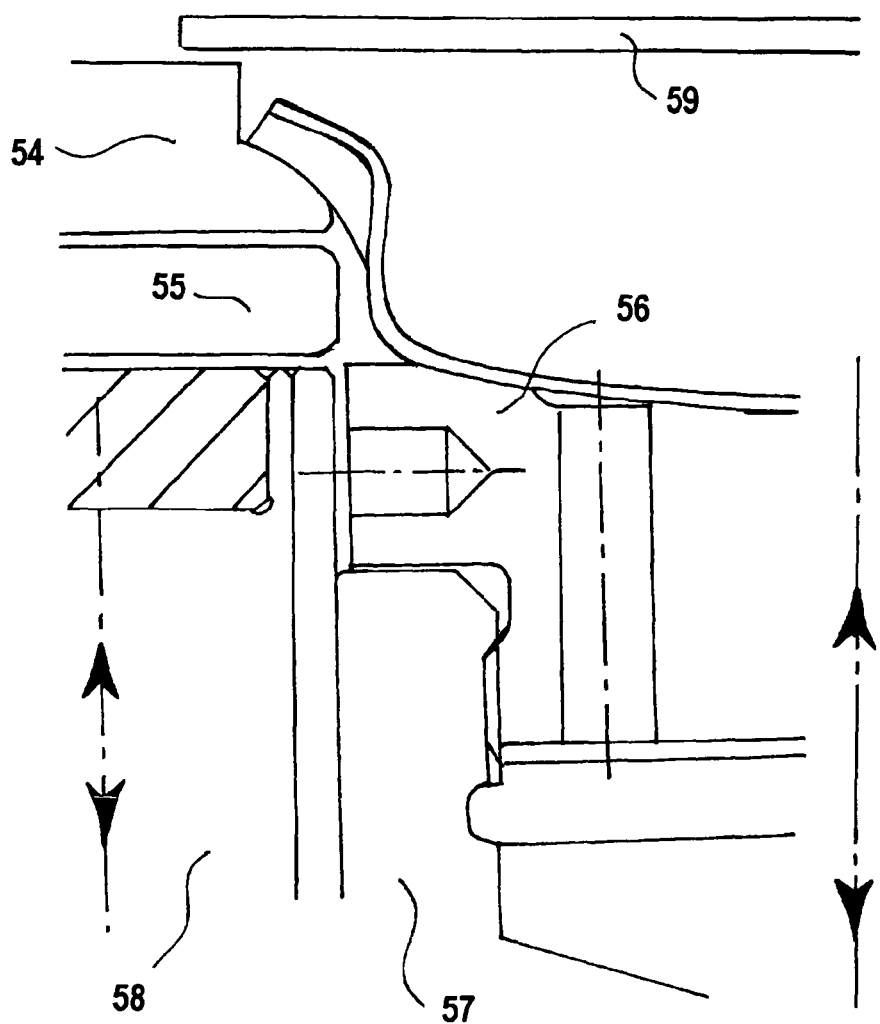
FIG. 13 shows a detail of the lower unit of a device for embossing caps with the bottom facing downwards.

In FIG. 13 there is illustrated a further version of the operating unit mounted on the embossing carousel. In this case the cap is received, rotated and during the rotation movement, embossed and then expelled, with the bottom portion facing downwards, i.e., with the concavity facing upwards. The caps are carried in an orderly manner in sequence inside the carousel, for example, by means of an inlet channel and with the help of an upper containing lid 59. Each cap is positioned so as to interact in contact with a conveying star 54 that rotates the cap. Each cap can be retained in position by a retaining arrangement such as, for example, one or more magnets that can be positioned, for example, in the supporting element 58. An extracting element 55 is also provided.

Figure 14:
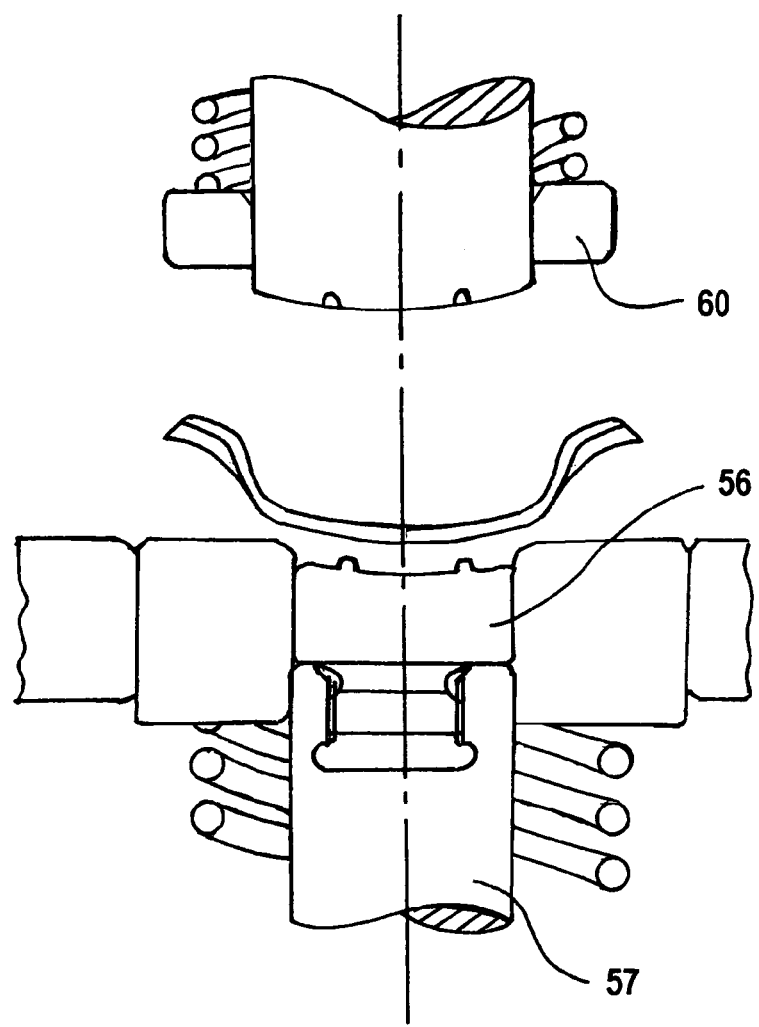
FIG. 14 shows the embossing device in FIG. 13 with also the upper embossing unit.

In FIG. 14 there is shown in greater detail the embossing device with the upper and the lower embossing unit. The lower unit is provided with a punch that can be provided, as in the case in point, with two parts 56 and 57, and with a sheet-metal presser of annular shape (operationally associated with an elastic thrust element) that surrounds the part 56 of the embossing punch intended for embossing contact with the cap. The punch can be divided into at least two parts to be able to replace very rapidly the effectively printing part 56 (intended for embossing contact). In use, the cap is pushed to the upper punch by lifting the lower embossing unit. At a certain point of the approach stroke, the cap meets the upper unit and is locked in the embossing position by the sheet-metal pressers of the lower unit. The lower punch 56 and 57 (having in the case in point a raised pictogram) thus cooperates with the upper embossing punch (having in the case in point a corresponding recessed pictogram) to impress the raised pictogram on the cap. The upper unit is provided with a ring 60, optionally loaded by an elastic element as in the case illustrated here, having in this case the function of being an extractor of the cap from the upper punch.

Figure 15:
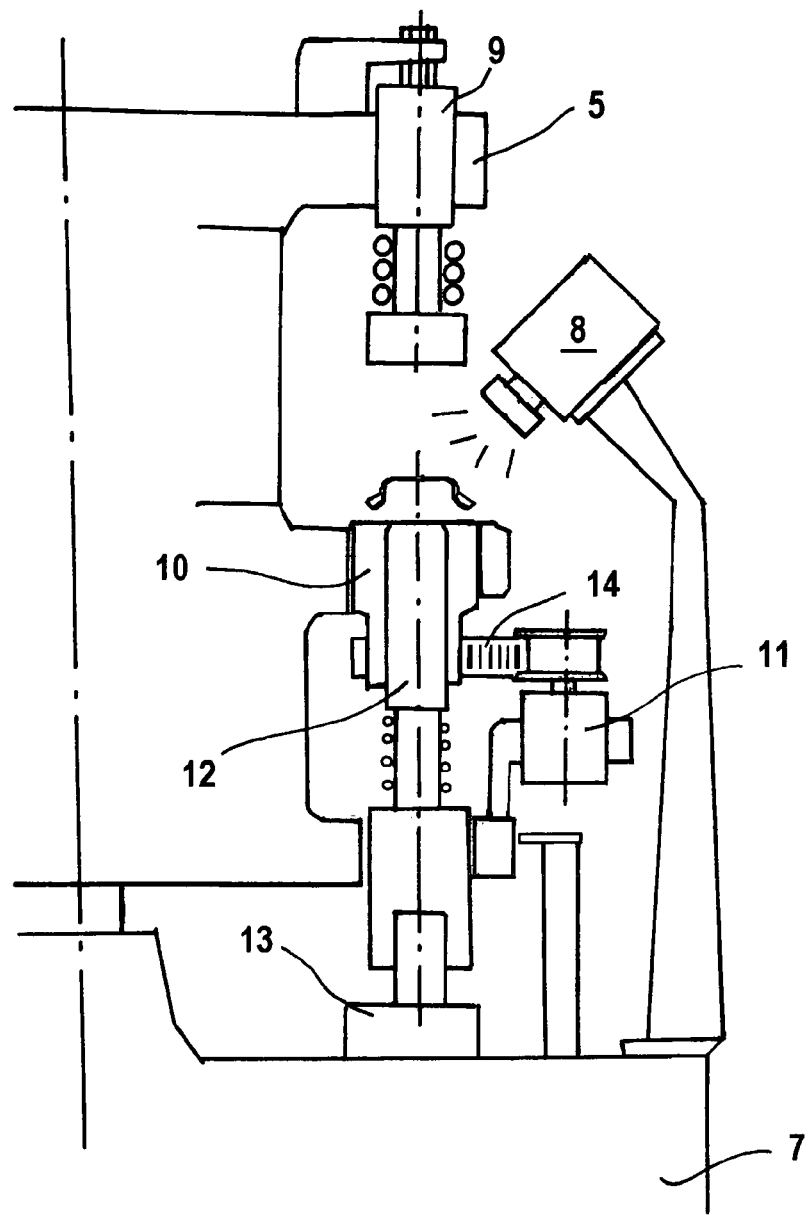
FIG. 15 shows a further embodiment of a carousel for conveying caps in the context of an embossing apparatus with a different system for detecting the preprinted image on the caps.

In FIG. 15 there is illustrated an embodiment in which the sensor 8 set up for detecting the preprinted image on the cap is arranged tilted (with an oblique arrangement) with respect to the advancing path of the caps arranged on the carousel (path that lies on a horizontal plane). The sensor 8 may include a camera or other devices of capturing the CVS image that, instead of being arranged at 90° or on an axis as disclosed in the preceding cases, can operate at a tilted working axis.

Figure 16:
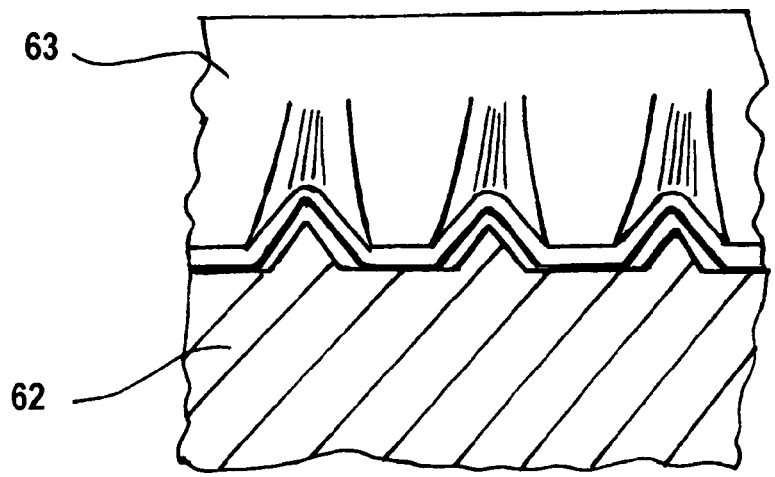
FIG. 16 shows a detail of a device for retaining a cap and for varying the positioning thereof.

With reference to FIG. 16, there is shown a system for varying the positioning of the cap, for example for the purpose of placing in phase (i.e. in a preset reciprocal arrangement) the (lithographical) drawing found on the cap and the raised impression to be obtained by embossing.

For this purpose, it is possible to provide in the cap production (forming) step (for example in the blanking and drawing press of the sheet metal for obtaining a crown cap provided on the periphery with knurling) for the knurling being in phase (i.e. with a preset mutual arrangement) with respect to the preset design on the sheet metal. This gives the possibility of using advantageously a gripping and reference system of the cap (with knurling) like that disclosed in FIG. 16, in which a grasping rotatable spindle 62 of the cap 63 is provided with a plurality of teeth and of gaps that are couplable (with joint coupling) with the crown formed by the knurling on the cap 63.

During the step of varying the positioning of the cap the spindle 62 is rotated on the basis of the image signal detected by the sensor. Using a joint coupling system with the knurled crown on the cap 63 favours the positioning of the cap and thus precision in the operation of putting into phase the design on the cap 63 and the tool that will have to perform embossing on the cap.

Figure 17:
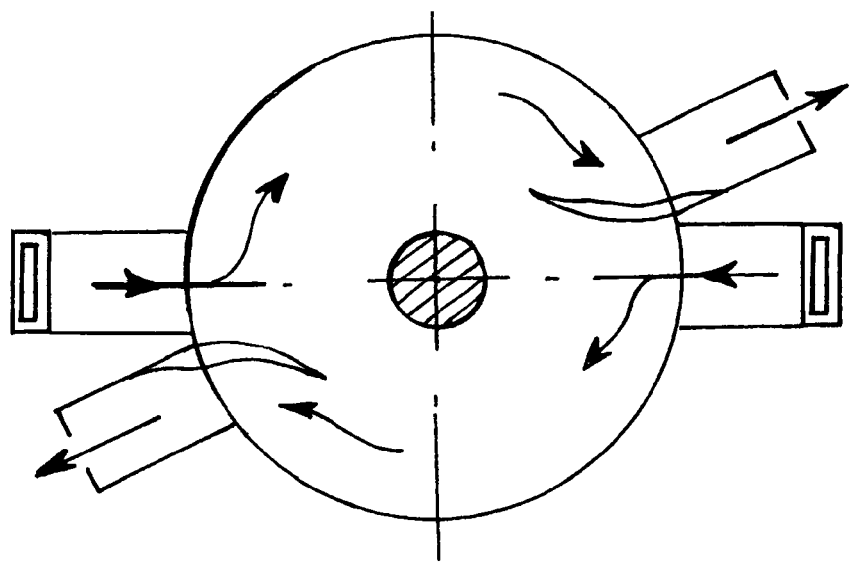
FIG. 17 shows a further embodiment of an embossing apparatus for closing caps for containers in a top plan view.

In FIG. 17 there is illustrated another embodiment in which a single embossing carousel is provided with at least two inlets and two outlets for the caps (as indicated by the arrows that disclose the two advancing paths that follow the two groups of caps arranged in sequence in an orderly manner). This arrangement of two paths on the same carousel could be used, for example, if there is no need to put the lithographic design into phase with the raised imprint. The various operating units (operating on the caps of both paths) can be made as in the cases disclosed previously. The embodiment in FIG. 17 has an advantage in terms of cost and overall dimensions, inasmuch as the same operating units (in particular the embossing devices) machine at least two caps at each carousel revolution.

Figure 18:
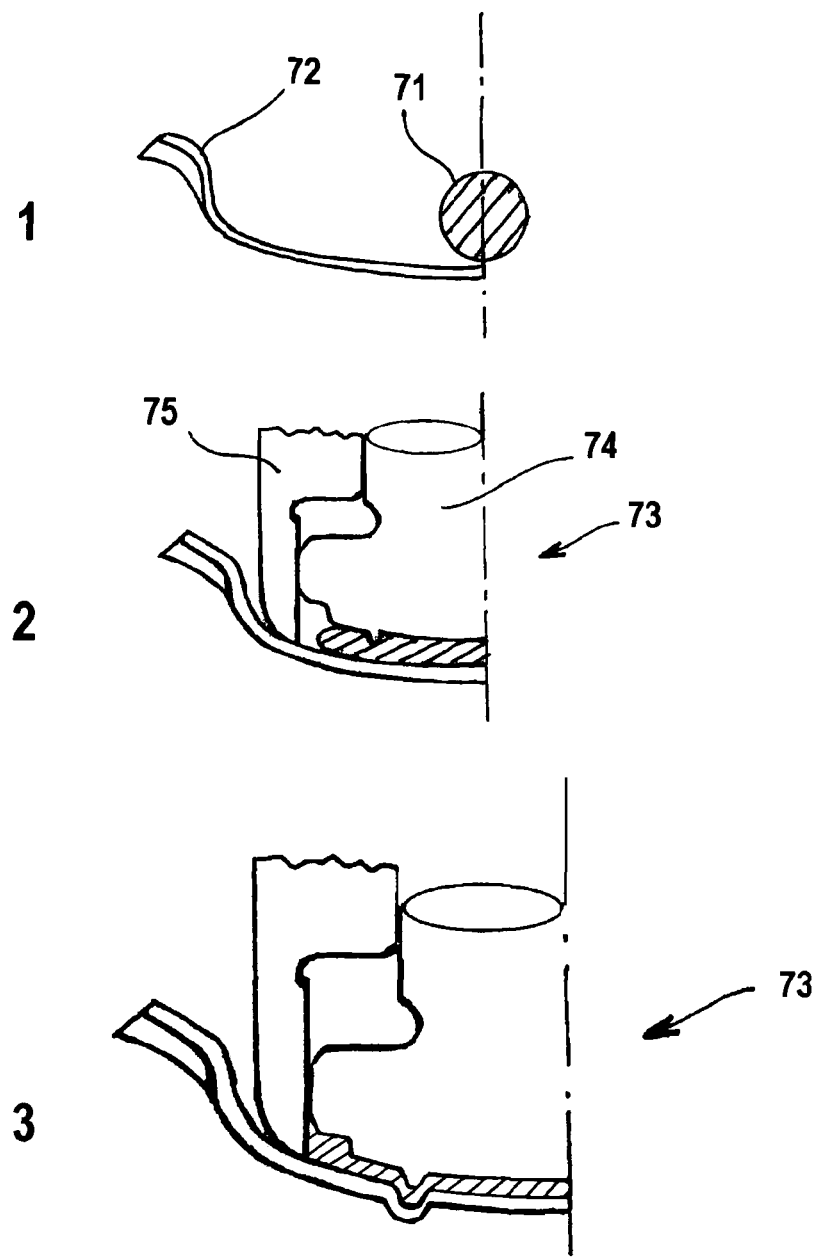
FIG. 18 shows three operating steps in sequence of a method for simultaneous embossing and moulding of a seal inside a cap for closing containers.

In FIG. 18 there are shown three different steps of a forming/embossing operation in which the embossing of the cap (i.e. of the generally metal structure of the concave body of the cap, as in the case in point disclosed here) is performed simultaneously with the compression-moulding of the seal, which is in general formed inside the concave structure. The seal, as known, will have the function of forming a seal on the upper mouth of the neck of the container to which the closing cap will be applied.

The cap, comprising for example a concave body structure of a crown cap for bottles or a lid for receptacles or of another type of known metal cap, has been made by compression-forming a sheet or laminate material. The method for forming the cap 72 is substantially known (for example moulding with blanking and drawing) and is not disclosed here in detail.

The embossing/forming device can be applied to any of the operating units associated with a carousel disclosed previously.

In this case two machinings are combined (moulding of the seal and embossing of the concave structure of the cap) in the context of the same operating unit or embossing/forming device, with consequent space and cost advantages compared to a solution with two separate devices, one for embossing the cap and the other for moulding the seal. The procedure comprises a step of depositing a dose of plastics 71 (in a plasticised state) inside the concave part of the structure of the cap 72, as illustrated in the part 1 at the top of FIG. 18. This operation is substantially similar to the (known) operation of inserting the dose of plastics that is currently used for moulding a seal in a usual closing cap for containers. This operation of depositing the dose of plastics is not discussed here in greater detail.

In the subsequent step (shown in the intermediate part 2 in FIG. 18) the dose of plastics is partially compressed by an (upper) punch 73 having a raised pictogram (as in this case) or a recessed pictogram. The punch 73 could be provided with a cooling system to maintain the punch at a relatively low temperature.

The punch 73 is made in this case of two parts in which a central part 74 bears the embossing impression (pictogram) whilst a peripheral part 75 with an annular shape surrounds the central part (similarly to other types of punches that were already used to perform lining of the caps, i.e. forming of the internal seal) and is liable to undergo an axial movement (in the same direction as the compression-moulding movement of the seal and the embossing movement of the pictogram) with respect to the central part 74. The peripheral part 75 will perform the function of laterally containing the plastics of the seal in the subsequent step (part 3 in FIG. 8) in which compression-moulding of the seal is completed and in which the pictogram is further embossed on the bottom portion of the cap 72. The embossing device will comprise a counterpunch (which is not illustrated) that cooperates with the embossing punch 73 to perform moulding/embossing. The counterpunch can further perform the function of supporting the cap during the various moulding/embossing steps. The counterpunch may be further provided with counter-shaping (counter-impressing for raised or recessed embossing) that cooperates with shaping (raised or recessed embossing impression) on the moulding/embossing punch 73.

The moulding/embossing device can also be provided with an elastic element that operates on the peripheral part 75 to maintain the peripheral part 75 at a certain load in contact with the cap.

It is possible to provide, as shown in the part 3 in FIG. 18, for the embossing operation causing deformation (embossing) also of the seal. In particular it is possible to provide for the embossing device operating so as to maintain a continuous covering without interruptions or lack of plastics of the seal on the internal surface of the cap bounded by the peripheral part 75. In substance it is possible to ensure that the central part 74 of the embossing punch 73 does not come into contact with the cap, to define a forming cavity having, if possible at each point, a distance space between the internal surface of the cap and the part 74 of the embossing punch that bounds above the forming cavity, in which this distance space is filled with the plastics that form the seal.

It has been found that the layer of material (plastics) that is interposed between the embossing punch 74 and the cap 72 and which will form the internal seal of the cap, might not have a constant thickness, even if the punch 74 does not come into contact with the cap 72. It is, for example, possible that the material does not completely occupy the space of the forming cavity, thus leaving zones with a greater thickness of material and other zones with a lesser thickness of material. It is anyway possible to obtain a distribution of plastics that is such as to form a seal that is able to ensure an effective seal of the cap in closing a container.

With reference to FIGS. 19 to 21, an apparatus 81 is now disclosed for producing caps for closing containers (in particular for producing crown caps), in which each cap is provided with embossing and with an internal seal. The apparatus 81 comprises an embossing apparatus 82 of the carousel type, that may comprise (as in the case in point) one of the embossing carousels disclosed previously. The embossing apparatus 82 has an inlet connected to a cap-supplying device (of known type, for example of the type that advances in line with the caps arranged one after the other, optionally on a horizontal path) and an outlet connected to a transferring carousel 83. The caps are conveyed in an orderly manner by the supplying device to the embossing apparatus 82, which receives the caps and rotates the caps (clockwise in the example in FIG. 19) whilst it embosses the caps (in one of the manners disclosed previously). The embossing apparatus 82 is provided with a plurality of embossing devices, for example like those disclosed previously, distributed on the periphery of the carousel spaced angularly from one another to perform embossing during rotational motion.

The embossed caps are then surrendered to the transferring carousel 83, which conveys the caps (along a rotational path with a motion that in the example in FIG. 19 is anticlockwise) to a system (lining system 84 of substantially known type) to apply a seal of plastics inside the cap. The lining system 84 may comprise, as in the case in point, a dose-depositing carousel 85 that receives the caps one at a time from the transferring carousel 83 and conveys the caps to a dispensing zone of a plastics extruder. In this dispensing zone a cutting device separates a dose of plastics from the continuous flow that is dispensed by the extruder, synchronised with the advancing movement of the caps, such that each dose of material falls inside a cap. Continuing along the apparatus path, each dose is compression-moulded inside each cap by the moulding devices of a moulding carousel 86 (having a plurality of angularly spaced moulding devices) after the dose-depositing carousel 85 (with the optional interposition of an intermediate transferring carousel). The caps with the embossing and the seal are then moved away in a known manner towards another user.

The invention claimed is:

1. A method, comprising the steps of
   (a) providing at least one concave, body having a pattern;
   (b) detecting a pattern, said detecting step comprising receiving at least one signal corresponding with said pattern;
   (c) comparing said signal with a stored reference signal;
   (d) varying a relative position between a compression punch and said concave body on the basis of said comparison; and
   (e) forming a pictogram in relief on said concave body with said compression punch, said pictogram being formed in a desired position with respect to said pattern.

2. A method according to claim 1, wherein said concave body comprises a metal shell for making a cap for containers.

3. A method according to claim 1, and further comprising the step of supplying a plurality of concave bodies one after the other to a conveying carousel, each of said concave bodies having a pattern, one or more of said steps of detecting, forming or varying occurring in at least one of said conveying carousel and further conveying carousels located downstream of said conveying carousel.

4. A method according to claim 1, wherein said detecting step comprises the step of moving said concave body opposite an optical sensor.

5. A method according to claim 1, wherein said step of providing a concave body comprises the step of compression-molding material to form said concave body and further comprises the step of transferring said concave body from a first zone where said compression-molding step occurs to a second zone where said forming a pictogram in relief step occurs, and wherein said compression-moulding step comprises the steps of drawing and cutting a sheet or laminar material, said pattern being applied to said sheet or laminar material before said compression-moulding step.

6. A method according to claim 1, wherein said step of providing a concave body comprises supplying a plurality of concave bodies in sequence in a manner ordered along a path, each of said concave bodies having a pattern.

7. A method according to claim 1, wherein said varying step comprises rotating said concave body around a rotation axis passing through the concave body to modify an angular orientation of said pattern.

8. A method according to claim 7, wherein said rotation axis coincides with an axis of said compression punch.

9. A method according to claim 8, wherein said concave body has a central disk-shaped portion and an annular-shaped lateral portion that is transverse to said central portion and emerges from a peripheral zone of said central portion, said rotation axis being substantially perpendicular to said central portion in order to position said pattern according to a preset angular orientation with respect to said compression punch.

* * * * *